US005331312A

United States Patent [19]

Kudoh

[11] Patent Number: 5,331,312

[45] Date of Patent: Jul. 19, 1994

[54] OBSTACLE-DETECTING APPARATUS

[75] Inventor: Katsuhiro Kudoh, Kawasaki, Japan

[73] Assignee: Matsushita Electric Industrial Co., Ltd., Osaka, Japan

[21] Appl. No.: 925,756

[22] Filed: Aug. 7, 1992

[30] Foreign Application Priority Data

Aug. 23, 1991 [JP] Japan .............................. 3-259556

[51] Int. Cl.$^5$ ........................ G08B 13/00; H04N 7/18

[52] U.S. Cl. .................................. 340/541; 340/522; 348/149

[58] Field of Search ................ 340/541, 550, 555-557, 340/521-522, 937, 988; 358/105, 107-109; 367/93; 342/27; 364/516-517

[56] References Cited

U.S. PATENT DOCUMENTS 3,365,572 1/1968 Strauss ............................ 340/557 X
4,063,283 12/1977 Rider et al. ......................... 358/107
4,578,665 3/1986 Yang .............................. 358/108 X
4,807,027 2/1989 Muto ................................. 358/108

FOREIGN PATENT DOCUMENTS 88991 of 1990 Japan ................................ 340/556
1320002 6/1973 United Kingdom ................ 340/556

*Primary Examiner*—Thomas Mullen
*Attorney, Agent, or Firm*—Stevens, Davis, Miller & Mosher

[57] ABSTRACT

This device can detect an obstacle in a railroad crossing or similar setting by way of image processing independently of a height and a width of an obstacle. The image data read from a video, camera 11 into a multi-valued image memory 13 is compared with background data stored in a background-data creating unit 15 in a data comparator 16. Based on the compared result, a still-object detector 17 detects if an obstacle exists. If it is detected that an obstacle exists and a rod of a crossing gate is down in a gate state detector 18, an alarm output unit 19 serves to output an alarm signal.

6 Claims, 3 Drawing Sheets

A : BEAM EMITTER 52
B : BEAM RECEPTOR 53

OBSTACLE-DETECTING APPARATUS

BACKGROUND OF THE INVENTION

The present invention relates to an obstacle-detecting apparatus which is adapted to detect an obstacle such as a vehicle stopped in trouble at a railroad crossing.

FIG. 5 shows a conventional obstacle-detecting apparatus installed at a railroad crossing. As shown, a numeral 51 denotes a control unit. A numeral 52 denotes a beam emitter. A numeral 53 denotes a beam receptor. A numeral 54 denotes a processing unit. A numeral 55 denotes a signal conditioning that a train comes closer to the crossing, which signal is entered into the control unit 51. A numeral 56 denotes a laser beam emitted from the beam emitter 52. A numeral 57 denotes an information indicating that an obstacle is detected. A plurality of pairs of the beam emitter 52 and the beam receptor 53 are installed at one railroad crossing.

Next, the description will be directed to how the obstacle-detecting apparatus shown in FIG. 5 operates. In response to the conditioning signal 55, the control unit 51 issues a command to the beam emitter 52 so that the beam emitter 52 may output the laser beam 56. In response to the laser beam 56, the beam receptor 53, installed in opposed relationship to the beam emitter 52 with the railroad laid therebetween, operates to output a signal to the processing unit 54. The processing unit 54 has a function of determining whether or not the beam receptor 53 outputs the signal. If no signal is received from the beam receptor 53 for a certain length of time, the processing unit 54 determines that any obstacle standing on the railroad between the beam emitter 52 and the beam receptor 53 impedes the laser beam 56 and thereby outputs the obstacle-detected information 57 to a next stage (not shown).

As set forth above, the conventional obstacle-detecting apparatus may have an arrangement that several pairs of the beam emitter and the beam receptor are installed at a railroad crossing for the purpose of detecting as an obstacle a vehicle stopped in trouble at the railroad crossing.

SUMMARY OF THE INVENTION

The conventional obstacle-detecting apparatus is arranged to detect an obstacle by determining if the laser beam 56 travels between the beam emitter 52 and the beam receptor 53. Depending on how the detector is installed at a crossing, therefore, it will be found out that there inevitably appears an area where an obstacle cannot be detected, because the detection is influenced by a beam-emitting interval or a height of an obstacle as shown in FIG. 6. That is, the conventional obstacle-detecting apparatus has a shortcoming that an obstacle inside of the area might not be detected.

To overcome the shortcoming, it is a first object of the present invention to provide an obstacle-detecting apparatus which is capable of detecting an obstacle in any area inside of a railroad crossing.

It is a second object of the present invention to provide an obstacle-detecting apparatus which is capable of, when imaging a railroad crossing, determining if a rod of a crossing gate is lifted up or down, based on an image picked up from a predetermined proper imaging angle for the purpose of eliminating the necessity of the signal indicating that a train comes closer to the crossing.

It is a third object of the present invention to provide an obstacle-detecting apparatus which is capable of outputting an image indicating how an obstacle enters into a railroad crossing or stopped therein.

An obstacle-detecting apparatus according to this invention is arranged to install a video camera so that it may image a railroad crossing from an overhead point of view, read the image data into a multi-valued image memory through an A/D converter, compare a background data with the image data read at each time, and determine that an obstacle exists if the different image data from the background data is detected when the rod of the crossing gate is down.

According to the invention, since the railroad crossing is imaged with the video camera, the obstacle-detecting apparatus enables to detect any still object inside of the railroad crossing as an obstacle however tall or wide the object may be. Further, the obstacle-detecting apparatus enables to set such an imaging angle as being able to determine how the rod of a crossing gate is down and determine the location of the rod on the image. Hence, for detecting an obstacle in the crossing, it does not need the information indicating that a train comes closer to a railroad crossing.

Moreover, the obstacle-detecting apparatus operates to output the image data stored in the multi-valued image memory and record the image data in an image recording unit. Hence, it can provide the information standing for how an obstacle enters in a railroad crossing and is stopped thereat.

DESCRIPTION OF THE PREFERRED EMBODIMENTS

Figure 1:
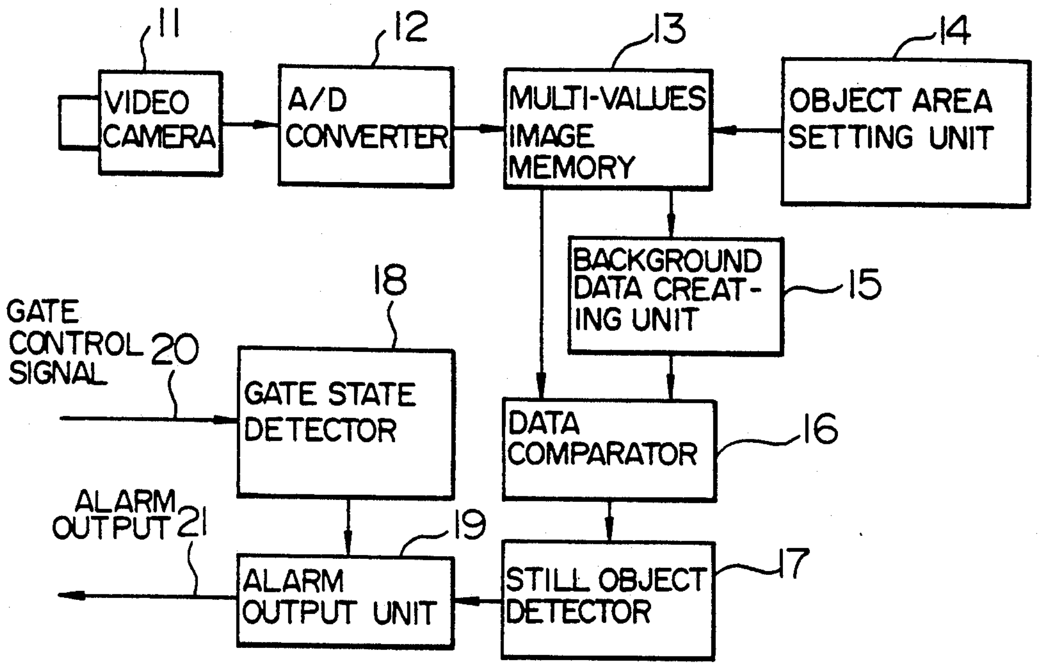
FIG. 1 shows an obstacle-detecting apparatus according to a first embodiment of the invention.

The description will be directed to the embodiments of the present invention as referring to the drawings.

First Embodiment

FIG. 1 is a block diagram showing an obstacle-detecting apparatus according to a first embodiment of the present invention. As shown, a numeral 11 denotes a video camera. A numeral 12 denotes an analog-to-digital (A/D) converter. A numeral 13 denotes a multi-valued image memory. A numeral 14 denotes a unit for setting an area where it is determined if a still object exists (referred to as an object area setting unit). A numeral 15 denotes a background data creating unit. A numeral 16 denotes a data comparator. A numeral 17 denotes a still-object detector. A numeral 18 denotes a detector for a state of a crossing gate (referred to as a gate state detector). A numeral 19 denotes an alarm output unit.

Now, the description is directed to the operation of the obstacle-detecting apparatus according to the first embodiment. A state of a crossing gate imaged from a overhead point of view by the video camera 11 is entered into the A/D converter 12 as analog two-dimensional image data. The A/D converter 12 supplies the converted digital image data into the multi-valued image memory 13. The object area setting unit 14 operates to pre-define an area of the multi-valued image memory 13 where a still object is to be determined. The background data creating unit 15 serves to select the image data representing a situation in which no obstacle such as a vehicle exists or passes through a railroad crossing from the image data sequentially stored in the multi-valued image memory 13 and store the selected image data.

The data comparator 16 serves to compare the data on the predetermined area of the multi-valued image memory 13 with the background data stored in the background data creating unit 15. If both of the data are not equal to each other, the information indicating the difference is output to the still object detector 17.

In a case that the still object detector 17 receives an output from the data comparator 16 for a predetermined length of time, the still object detector 17 outputs the information to the alarm output unit 19. The gate state detector 18 serves to determine if the gate rod is lifted up or down, based on an outside gate control signal 20 such as information indicating that a train comes closer and then output the determined signal to the alarm output 19. If the alarm output unit 19 receives both an input signal from the still object detector 17 and the information signal indicating that a gate rod is lifted down from the gate state detector 18, the alarm output unit 21 serves to output an alarm signal 21 to a next stage (not shown).

As set forth above, the obstacle-detecting apparatus according to the first embodiment is arranged to convert three-dimensional information imaged from an overhead point of view by the video camera 11 into two-dimensional information. Hence, it is capable of detecting an obstacle however tall or wide an obstacle may be.

Second Embodiment

Figure 2:
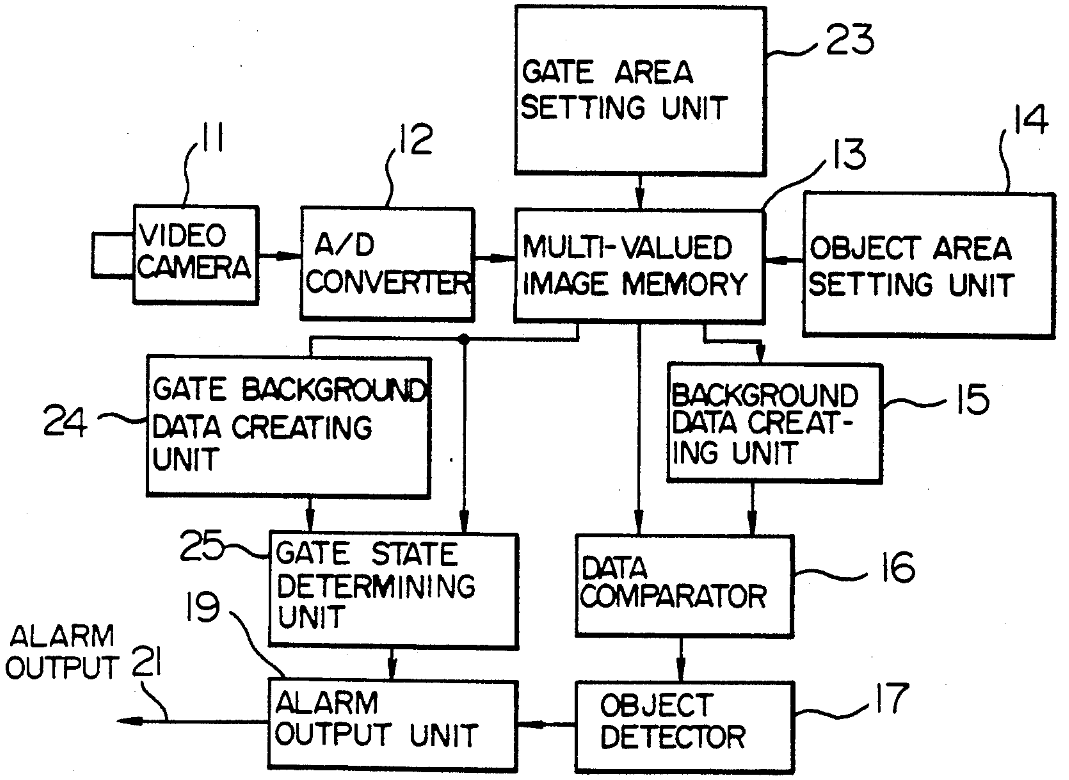
FIG. 2 shows an obstacle-detecting apparatus according to a second embodiment of the invention.

FIG. 2 is a block diagram showing an obstacle-detecting apparatus according to a second embodiment of the invention. A unit 23 for setting an area where a state of a crossing gate is determined (referred to as a gate area setting unit) and a unit 24 for creating background data about a crossing gate (referred to as a gate background data creating unit 24) are additionally provided to the arrangement of the first embodiment. In place of the gate state detector 18 shown in FIG. 1, a unit 25 for determining a state of a crossing gate, that is, if a crossing gate rod is lifted up or down (referred to as a gate state determining unit 25) is provided. The same numerals as those shown in FIG. 1 indicate the same components.

Figure 3:
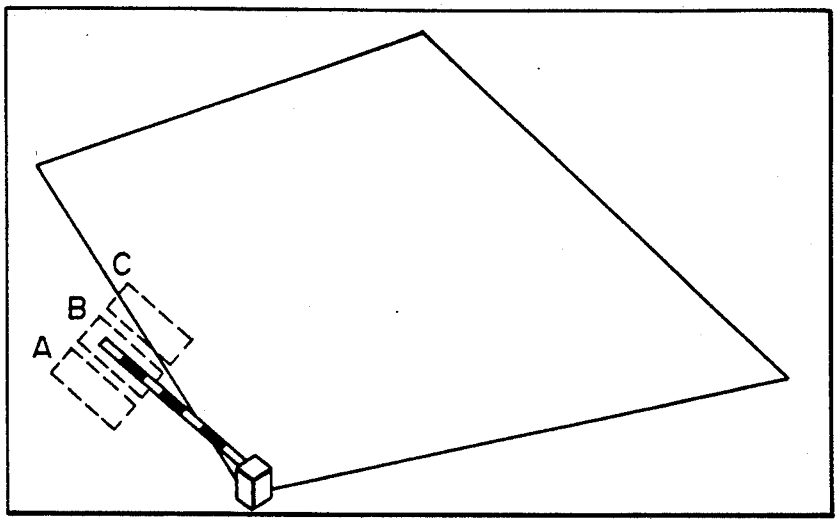
FIG. 3 shows how an area for determining a state of a crossing gate is set.

Now, the description is directed to the operation of the obstacle-detecting apparatus according to the second embodiment. At first, the gate area setting unit 23 serves to define an area of the multi-valued image memory 13 where it is determined that the gate rod is lifted down. FIG. 3 is an overhead view showing the defined area. The gate background data creating unit 24 prepares the image data representing that no obstacle such as a vehicle exists or passes through a railroad crossing from the data on the defined area stored in the multi-valued memory 13 as background data. The gate state determining unit 25 serves to determine that the gate rod is lifted down if areas A and C have the same data as the background data and an area B has a different data from the background data as shown in FIG. 3 and output the determined information to the alarm output unit 19. That is, the obstacle-detecting apparatus according to the second embodiment is capable of determining when a train comes closer to a railroad crossing without the external gate control signal required in the first embodiment.

According to the second embodiment, as mentioned above, the colors of the crossing gate, black and yellow, can be distinguished from a road color used as the background data. Hence, unlike the first embodiment, the obstacle-detecting apparatus of the second embodiment enables to determine if the gate rod is lifted up or down.

Third Embodiment

Figure 4:
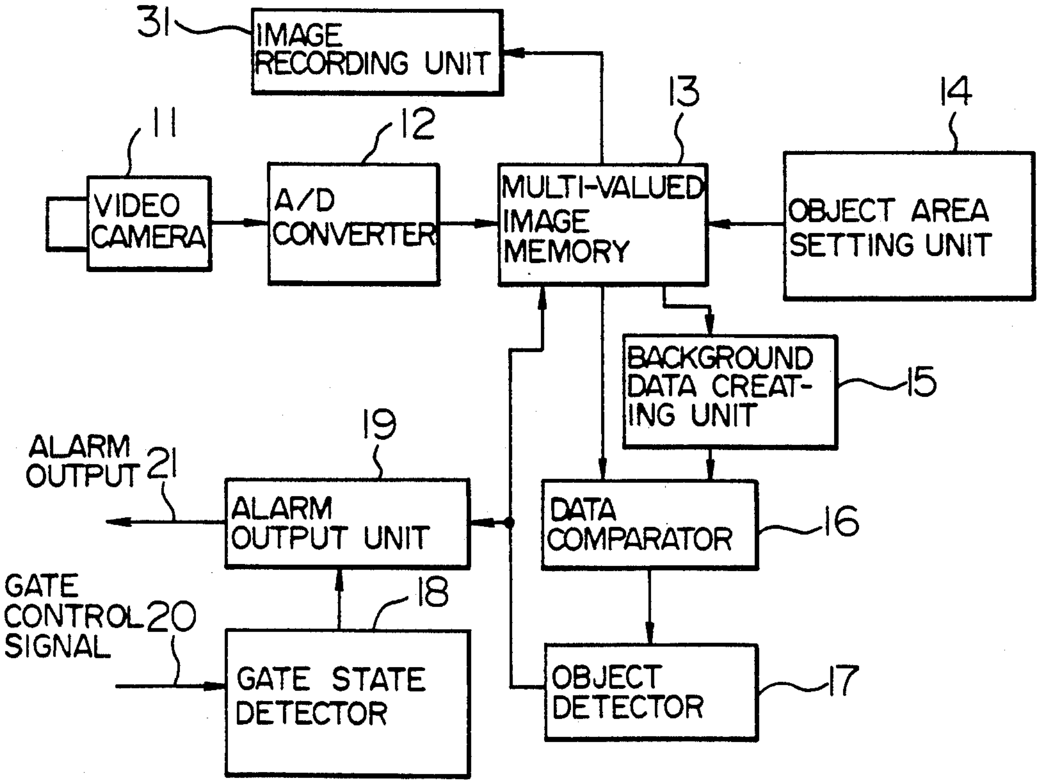
FIG. 4 shows an obstacle-detecting apparatus according to a third embodiment of the invention.
Figure 5:
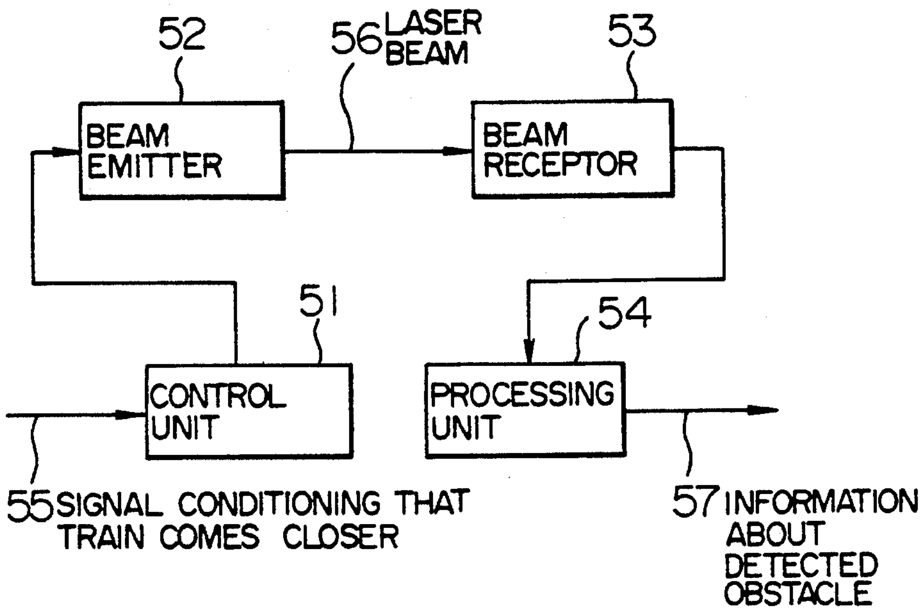
FIG. 5 PRIOR ART
FIG. 5 shows a conventional obstacle-detecting apparatus.
Figure 6:
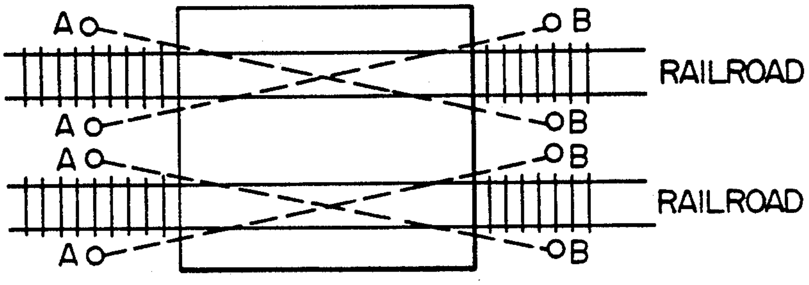
FIG. 6 PRIOR ART
FIG. 6 shows how the conventional obstacle-detecting apparatus shown in FIG. 5 is installed.

FIG. 4 is a block diagram showing an obstacle-detecting apparatus according to a third embodiment of the invention. An image recording unit 31 is additionally provided to the arrangement of the first embodiment. The other components of the third embodiment have the same numerals as those of the first embodiment.

The description is now directed to the operation of the obstacle-detecting apparatus according to the third embodiment. The still object detector 17 outputs the detection signal to the alarm output unit 19 and the multi-valued image memory 13 at a time when a still object is detected. The multi-valued image memory 13 serves to keep the image data imaged for each predetermined time by the video camera 11 sequentially stored. If it receives a signal from the still object detector 17, the multi-valued image memory 13 operates to sequentially output the image data stored until the object-detected time to the image recording unit 31 for recording the image data. In response to the information indicating that the gate rod is lifted down sent from the gate state detector 18 and the information indicating a still object is detected sent from the still object detector 17, the alarm output unit 19 operates to output an alarm output 21 to a next stage (not shown).

As set forth above, according to the third embodiment, the still object detector 17 serves to detect a still object. If the gate rod is down, it is determined that an obstacle exists at the railroad crossing and the alarm output 21 is output to a next stage for the purpose of preventing occurrence of an accident. Since the image data accumulated in the multi-valued image memory 13 until a still object is detected is recorded in the image recording unit 31, it is possible to obtain the information as to how the obstacle takes place on the railroad crossing.

The obstacle-detecting apparatus according to the present invention is arranged to convert the three-dimensional data of a railroad crossing imaged from an overhead point of view by a video camera into the two-dimensional data. Hence, the detection is allowed however tall or wide an obstacle may be.

Since the gate rod is always colored with black and yellow, it can be easily distinguishable from the road surface. Hence, without using an external signal indicating the gate rod is lifted down, it is possible to determine an obstacle on the railroad crossing.

The image data for each predetermined length of time is sequentially recorded in the multi-valued image memory. If, therefore, an obstacle is detected, it is easy to grasp how the obstacle takes place.

What is claimed is:

1. An obstacle-detecting apparatus comprising:

a video camera for producing images of a crossing zone;

image storing means having memory sufficient to store first image data based upon multiple images of said crossing zone produced by said video camera;

first means for setting dimensions of the crossing zone in which an object is to be detected;

second means for setting dimensions of a detection area within said crossing zone;

third means for setting background image data of said crossing zone based upon said first image data stored in said image storing means;

means for comparing said first image data with said background image data;

means, responsive to said first means for setting, for determining whether an object is located within said crossing zone based upon an output of said means for comparing;

fourth means for setting background data about the state of said crossing zone;

means for detecting whether a rod of a crossing gate associated with said crossing zone is up or down by comparing a portion of the first image data relating to said detection area and said background data set by said fourth means; and means for outputting an alarm responsive to (a) a detection by said means for detecting that said rod is down and (b) a determination by said means for determining that an object is within said crossing zone.

2. An obstacle-detecting apparatus as claimed in claim 1, wherein the means for setting background image data of said crossing zone comprises means for designating a portion of the first image data as the background image data of said crossing zone.

3. An obstacle-detecting apparatus as claimed in claim 2, wherein the portion of the image data designated as the background data of said crossing zone corresponds to one of the multiple images.

4. An obstacle-detecting apparatus comprising:

a video camera for producing images of a crossing zone;

images storing means having memory sufficient to store first image data based upon multiple images of said crossing zone produced by said video camera;

first means for setting dimensions of the crossing zone in which an object is to be detected;

second means for setting background image data of said crossing zone based upon said first image data stored in said image storing means;

means for comparing said first image data with said background image data;

means, responsive to said first means for setting, for determining whether an object is located within said crossing zone based upon an output of said means for comparing;

means for detecting if a rod of a crossing gate associated with said crossing zone is up or down;

means for outputting an alarm responsive to (a) a detection by said means for detecting that said rod is down and (b) a determination by said means for determining that an object is within said crossing zone; and means for recording the first image data accumulated in said image storing means when a still object is detected by said means for determining simultaneously with said alarm means outputting an alarm.

5. An obstacle-detecting apparatus as claimed in claim 4, wherein the means for setting background image data of said crossing zone comprises means for designating a portion of the first image data as the background image data of said crossing zone.

6. An obstacle-detecting apparatus as claimed in claim 5, wherein the portion of the image data designated as the background image data of said crossing zone corresponds to one of the multiple images.

* * * * *